A. ORTENGREN.
TRACTOR DRIVING GEAR.
APPLICATION FILED APR. 8, 1916.
1,262,837.
Patented Apr. 16, 1918.
2 SHEETS—SHEET 1.
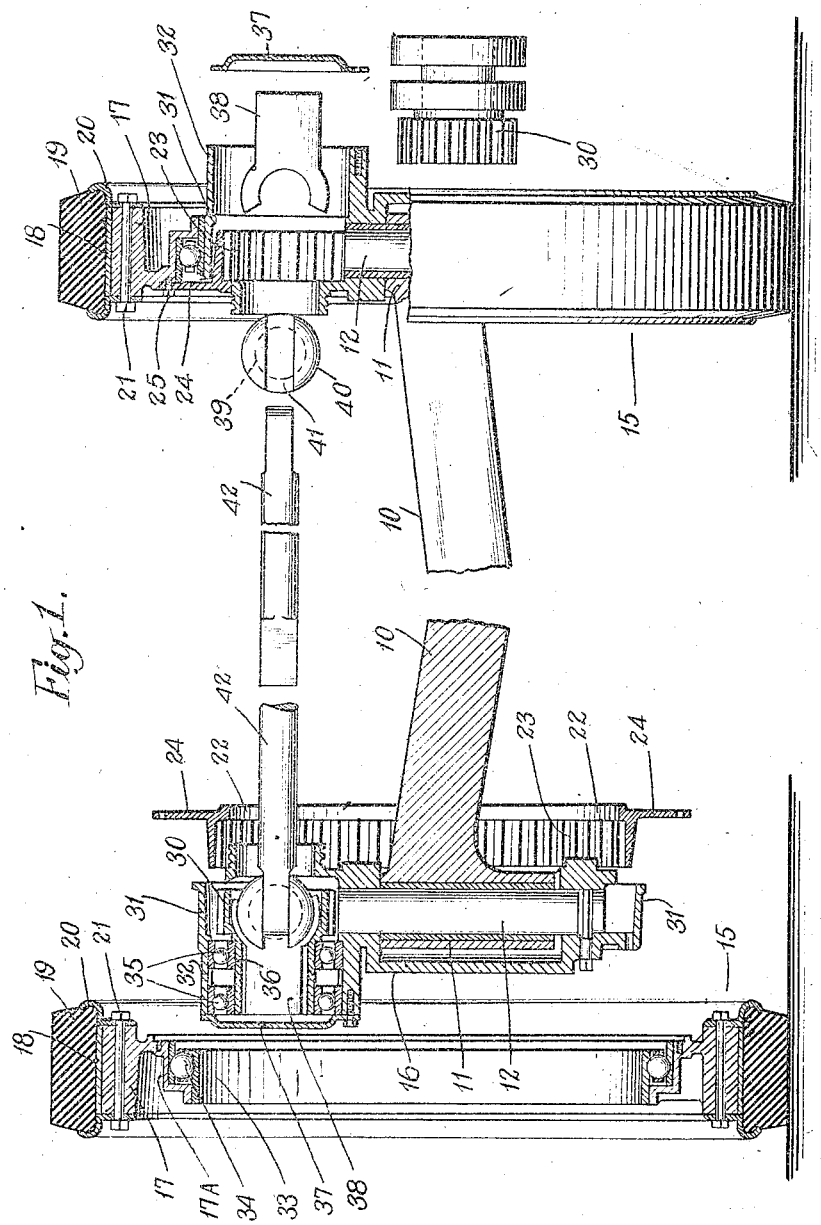
INVENTOR
Alfred Ortengren
BY
E. W. Marshall
ATTORNEY A. ORTENGREN.
TRACTOR DRIVING GEAR.
APPLICATION FILED APR. 8, 1916.
1,262,837.
Patented Apr. 16, 1918.
2 SHEETS—SHEET 2.
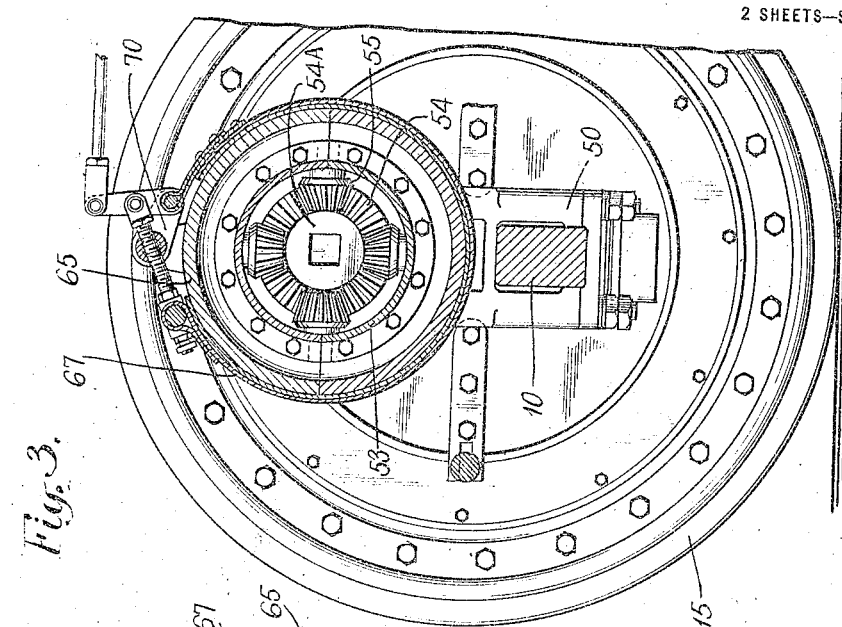
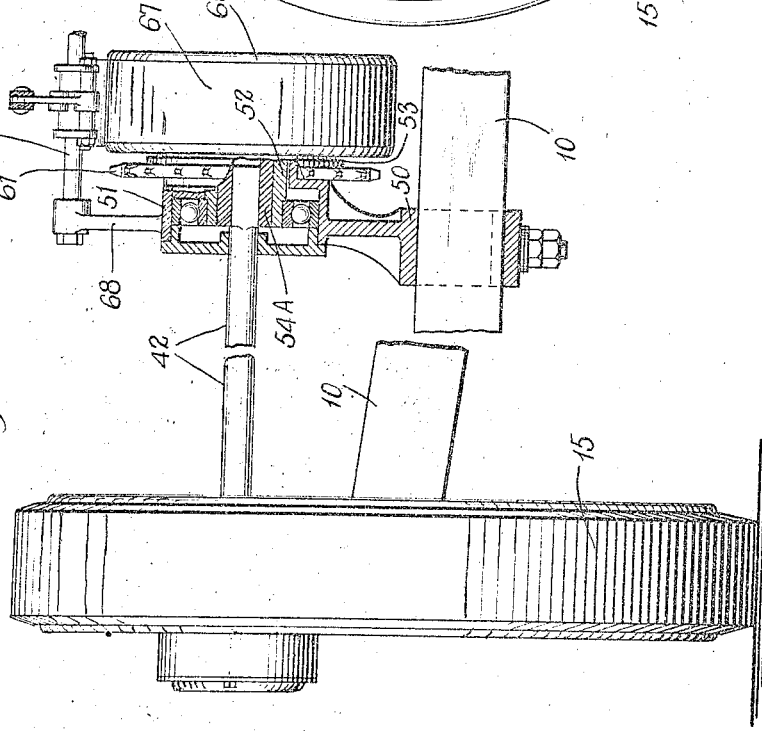
INVENTOR
Alfred Ortengren
BY
E. W. Marshall
ATTORNEY

UNITED STATES PATENT OFFICE.

ALFRED ORTENGREN, OF HOBOKEN, NEW JERSEY, ASSIGNOR TO ELIZABETH CHRISTIE, OF WEEHAWKEN, NEW JERSEY.

TRACTOR DRIVING-GEAR.

1,262,837.  Specification of Letters Patent.  Patented Apr. 16, 1918.

Original application filed June 2, 1914, Serial No. 842,455. Divided and this application filed April 3, 1916. Serial No. 89,747.

*To all whom it may concern:*

Be it known that I, ALFRED ORTENGREN, a citizen of the United States of America, and a resident of Hoboken, Hudson county, New Jersey, have invented certain new and useful Improvements in Tractor Driving-Gears, for which I have filed an application for Letters Patent on the 2d day of June, 1914, and of which this is a divisional application; furthermore, the following is a specification, reference being had to the accompanying drawings, forming a part thereof.

My invention relates to motor vehicles and particularly to driving connections for the steered wheels of tractors.

In my copending application Serial No. 842,455 filed June 2, 1914, of which this application is a division, I have covered the wheel structure of a tractor, particularly with reference to the members which are attached to the rotating part of the wheel and to a with it. My present application is primarily concerned with the structure of the inner portion of the wheel which does not turn and the driving connection by which the rotation of the outer portion of the wheel is effected.

One object of my invention is to provide a simple and particularly desirable connection and structure of the character and for the purpose above indicated, that shall be arranged to permit the ready removal of the parts of the driving connection which are carried by the inner relatively stationary part of the wheel.

Other objects and advantages of my invention will be set forth hereinafter, and in order that my invention may be thoroughly understood, I will now proceed to describe the same in the following specification, and then point out the novel features thereof in appended claims.

Referring to the drawings:

Figure 1 is a transverse sectional elevation through the center of the axle, of a motor vehicle showing the wheel and its driving connections arranged and constructed in accordance with my invention.

Fig. 2 is an elevation of the axle with the driving connection to the differential shown in section.

Fig. 3 is a partially sectional view at right angles to Fig. 2.

The structure illustrated comprises an axle 10, wheels 15, wheel driving gears, a pair of removable shafts, and a universal joint interposed between the shaft and the driving gear.

The axle 10 has a vertical sleeve 11 at each end, to which is pivotally connected, by a knuckle pin 12, an inner member 16 of one of the wheels 15. In addition to the inner member 16 each of the wheels comprises an annular outer member 17 which constitutes a support for the rim of the wheel. 18 is a steel band or rim surrounding the outer cylindrical surface of the member 17. A tire 19 is mounted on the band 18 and is held in position by a pair of flanges 20 which are hook-shaped in cross-section and are clamped to the member 17 by bolts 21. Another annular member 22, which has an integral spur gear 23 and a flange 24, is secured to the member 17 by bolts 25. The teeth of the gear are internally cut and are arranged to mesh as explained below with the teeth of the pinion 30.

The inner wheel member 16 has an annular flange 31 and a relatively small eccentric sleeve or cylindrical projection 32. The flange 31 is arranged to fit into a ring 33 and is rotatively mounted within the outer member 17 as clearly shown in Fig. 1, a frictionless bearing 34 being interposed between the ring 33 and an annular ledge 17ᴬ of the outer member.

Within the eccentric cylindrical projection 32 of the inner member is rotatively supported by frictionless bearings 35, the pinion 30 which has a hub 36. The outer end of the cylindrical projection 32 is closed by a cap 37.

Keyed within the hub 36 of the pinion is a plug 38 having a forked end to engage an annular groove 39 in a sphere 40. This sphere forms a part of a universal joint and is provided with a pair of opposite transverse slots 41 which are at right angles to the plane of the annular groove 39 and which are engaged by the forked end of one of the driving shafts 42. The opposite ends of the driving shafts are removably connected to the differential driving mechanism.

This mechanism comprises a pair of spaced brackets 50 having cylindrical pockets 51 into which the respective ends 52 of the differential casing 53 extend. The ends 52 are in the form of cylindrical sleeves which are in alinement with each other, the central portion of the differential casing being enlarged to form a box in which differential gears 54 and 55 are located.

Secured to the casing is a sprocket wheel 61 with which meshes a driving chain (not shown).

A brake wheel 65 is bolted to the casing 53 and has a cylindrical outer surface with which a brake band 67 coöperates. The brackets 50 have extensions 68 interconnected by a rod 69 upon which brake actuating toggle links 70 are supported.

The hubs 54^A of the gears 54 are provided with square holes or openings of other suitable shape into which the correspondingly shaped ends of the shafts 42 freely extend to form an operative connection therewith.

The opening in the eccentric sleeve 32 of the inner wheel member 16 is relatively large to permit the pinion 30 to be withdrawn outwardly when the cap 37 is removed. The removed pinion, together with the frictionless bearings is shown at the right hand end in the drawing. The forked plug 38 may then be freely removed since it is in no way attached to the other parts of the universal joint. The sphere 40 is then entirely free and may be removed through the same opening. In fact the shaft 42 is also free inasmuch as its inner end is operatively connected to one of the gears 54 by merely being inserted in a suitable opening in the gear hub.

The advantages of this arrangement are apparent to anyone skilled in the art, for example, it is particularly desirable to be able to take apart the driving mechanism in the manner above indicated for cleaning, inspection, and repairs when the tractor is used in connection with fire-fighting apparatus where it is essential to keep the device in working order at all times. The arrangement shown enables any part to be very quickly removed and replaced by a new one.

As shown at the left in the drawing, the outer member of the wheel may be quickly and easily removed from the inner member without disturbing the driving gears at all, except to remove the bolts 25 by which the gear 22 is attached to the outer member.

What I claim is:

1. A vehicle driving gear comprising a wheel having an outer relatively rotatable member, a gear secured to the outer member, an inner member, a sleeve forming a part of the inner member, a pinion rotatively mounted therein, adapted to mesh with the gear and removable outwardly from the sleeve, a plug removably mounted within the pinion and connected to rotate therewith, a driving shaft, a detachable universal joint connection between the shaft and the plug, and a removable cap for closing the outer end of the sleeve.

2. A vehicle driving gear comprising a wheel having an outer relatively rotatable member, an internal gear secured to the outer member, an inner member, frictionless bearings between the inner and outer members, an eccentric sleeve forming a part of the inner member, a pinion rotatively mounted therein, adapted to mesh with the internal gear and removable outwardly from the sleeve, a forked plug removably mounted within the pinion and connected to rotate therewith, a driving shaft having a forked end, a slotted sphere interposed between the ends of the plug and shaft to form a universal joint connection between them, and a removable cap for closing the outer end of the sleeve.

3. A vehicle driving gear comprising a wheel having an outer relatively rotatable member, an internal gear secured to the outer member, an inner member, frictionless bearings between the inner and outer members, an eccentric sleeve forming a part of the inner member, a pinion rotatively mounted therein, adapted to mesh with the internal gear and removable outwardly from the sleeve, a plug or short shaft removably mounted within the pinion and connected to rotate therewith, a driving shaft, a universal joint connecting the driving shaft to the plug or short shaft, and a removable cap for closing the outer end of the sleeve.

4. A vehicle driving gear comprising an axle, a wheel of the axle having an inner member pivotally connected to the axle at one end, an outer member rotatively mounted on the inner member, an internal gear attached to the outer member, an eccentric sleeve forming a part of the inner member, a pinion rotatively and removably mounted therein and adapted to mesh with the internal gear of the outer member, and removable means for closing the outer end of the eccentric sleeve, whereby the pinion may be withdrawn outwardly from the sleeve.

5. A vehicle driving gear comprising an axle, a wheel of the axle having an inner member pivotally connected to the axle at one end, an outer member rotatively mounted on the inner member, an internal gear attached to the outer member, an eccentric sleeve forming a part of the inner member, a pinion rotatively and removably mounted therein and adapted to mesh with the internal gear of the outer member, a driving shaft removably and operatively connected to the pinion at one end, and a removable cap for closing the outer end of the eccentric sleeve whereby the pinion may be withdrawn outwardly from the sleeve.

6. A vehicle driving connection comprising an axle, a wheel, an internal gear thereon, a pinion meshing with the internal gear, a differential gear on the axle and an interposed driving shaft between the differential gear and the pinion, and removably connected to each whereby the shaft is adapted to be withdrawn axially through the internal gear.

7. A vehicle driving connection comprising an axle, a wheel, an internal gear thereon, a hollow pinion meshing with the internal gear, a differential gear on the axle having a driving socket and an interposed driving shaft fitted into said socket on one end and removably connected to the pinion at the opposite end, whereby it is adapted to be withdrawn axially.

8. A vehicle driving connection comprising an axle, a wheel, an internal gear thereon, a hollow pinion meshing with the internal gear, a differential gear on the axle having a square driving socket and an interposed driving shaft fitted into the socket at one end and extending into the hollow pinion at the opposite end, and a universal joint connection between the pinion and the adjacent end of the shaft.

9. A vehicle driving gear comprising a wheel having an outer relatively rotating member, an internal gear secured to the outer member, an inner member mounted to rotate within the outer member, an eccentric sleeve forming a part of the inner member, a pinion rotatively mounted thereon and intended to mesh with the internal gear and removable outwardly from the sleeve, a differential gear and an interposed driving shaft between the differential gear and the pinion removably connected to each of said parts, whereby the shaft is adapted to be withdrawn through said eccentric sleeve.

10. A vehicle driving gear comprising a wheel having an outer relatively rotating member, an internal gear secured to the outer member, an inner member mounted to rotate within the outer member, an eccentric sleeve forming a part of the inner member, a pinion rotatively mounted thereon and intended to mesh with the internal gear and removable outwardly from the sleeve, a differential gear having a driving socket and an interposed driving shaft fitted into said socket on one end and removably connected to the pinion at the opposite end, whereby it is adapted to be withdrawn axially.

11. A vehicle driving gear comprising a wheel having an outer relatively rotating member, an internal gear secured to the outer member, an inner member mounted to rotate within the outer member, an eccentric sleeve forming a part of the inner member, a pinion rotatively mounted thereon and intended to mesh with the internal gear and removable outwardly from the sleeve, a differential gear having a square driving socket and an interposed driving shaft fitted into the socket at one end and extending into the hollow pinion at the opposite end, and a universal joint connection between the pinion and the adjacent end of the shaft.

12. A vehicle driving gear comprising a wheel having an outer relatively rotating member, an internal gear secured to the outer member, an inner member mounted to rotate within the outer member, an eccentric sleeve forming a part of the inner member, a pinion rotatively mounted thereon and intended to mesh with the internal gear and removable outwardly from the sleeve, a plug or short shaft removably mounted within the pinion and connected to rotate therewith, a differential gear, an interposed driving shaft, a universal joint connecting the driving shaft to the plug or short shaft and a removable cap for closing the outer end of the sleeve, said driving shaft being removably connected to the differential gear.

In witness whereof, I have hereunto set my hand this 3d day of April, 1916.

ALFRED ORTENGREN.